(12) United States Patent
Jiao et al.

(10) Patent No.: US 8,644,643 B2
(45) Date of Patent: Feb. 4, 2014

(54) CONVOLUTION FILTERING IN A GRAPHICS PROCESSOR

(75) Inventors: Guofang Jiao, San Diego, CA (US); Yun Du, San Diego, CA (US); Chun Yu, San Diego, CA (US); Lingjun Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1027 days.

(21) Appl. No.: 11/453,436

(22) Filed: Jun. 14, 2006

(65) Prior Publication Data

US 2007/0292047 A1 Dec. 20, 2007

(51) Int. Cl.
*G06K 9/40* (2006.01)

(52) U.S. Cl.
USPC ............................ 382/279; 382/274; 382/275

(58) Field of Classification Search
USPC .................................. 382/260, 274, 275, 279
See application file for complete search history.

(56) References Cited

U.S. PATENT DOCUMENTS

| | | | |
|---|---|---|---|
| 3,469,244 A | 9/1969 | Perotto | |
| 4,079,452 A | 3/1978 | Larson et al. | |
| 4,361,868 A | 11/1982 | Kaplinsky | |
| 5,517,611 A | 5/1996 | Deering | |
| 5,590,326 A | 12/1996 | Manabe | |
| 5,598,546 A | 1/1997 | Blomgren | |
| 5,777,629 A | 7/1998 | Baldwin | |
| 5,793,385 A | 8/1998 | Nale | |
| 5,794,016 A | 8/1998 | Kelleher | |
| 5,798,770 A | 8/1998 | Baldwin | |
| 5,831,640 A | 11/1998 | Wang et al. | |
| 6,831,640 B2 | 11/1998 | Wang et al. | |
| 5,870,579 A | 2/1999 | Tan | |
| 5,872,729 A | 2/1999 | Deolaliker | |
| 5,913,059 A | 6/1999 | Torii | |
| 5,949,920 A | 9/1999 | Jordan et al. | |
| 5,958,041 A | 9/1999 | Petolino, Jr. et al. | |

(Continued)

FOREIGN PATENT DOCUMENTS

EP 0627682 A1 12/1994
EP 0676691 A2 10/1995

(Continued)

OTHER PUBLICATIONS

International Search Report and Written Opinion- PCT/US07/069663, International Search Authority—European Patent Office, Jul. 15, 2009 (060979).

(Continued)

*Primary Examiner* — Yosef Kassa
(74) *Attorney, Agent, or Firm* — James R. Gambale, Jr.

(57) ABSTRACT

Techniques for performing convolution filtering using hardware normally available in a graphics processor are described. Convolution filtering of an arbitrary H×W grid of pixels is achieved by partitioning the grid into smaller sections, performing computation for each section, and combining the intermediate results for all sections to obtain a final result. In one design, a command to perform convolution filtering on a grid of pixels with a kernel of coefficients is received, e.g., from a graphics application. The grid is partitioned into multiple sections, where each section may be 2×2 or smaller. Multiple instructions are generated for the multiple sections, with each instruction performing convolution computation on at least one pixel in one section. Each instruction may include pixel position information and applicable kernel coefficients. Instructions to combine the intermediate results from the multiple instructions are also generated.

25 Claims, 8 Drawing Sheets

(56) References Cited

U.S. PATENT DOCUMENTS

| | | | |
|---|---|---|---|
| 5,991,865 A * | 11/1999 | Longhenry et al. | 712/7 |
| 6,092,175 A | 7/2000 | Levy et al. | |
| 6,188,411 B1 | 2/2001 | Lai | |
| 6,219,769 B1 | 4/2001 | Strongin et al. | |
| 6,226,604 B1 * | 5/2001 | Ehara et al. | 704/207 |
| 6,279,099 B1 | 8/2001 | Van Hook et al. | |
| 6,466,221 B1 | 10/2002 | Satoh et al. | |
| 6,480,941 B1 | 11/2002 | Franke et al. | |
| RE37,944 E | 12/2002 | Fielder et al. | |
| 6,493,741 B1 | 12/2002 | Emer et al. | |
| 6,516,443 B1 * | 2/2003 | Zook | 714/792 |
| 6,549,209 B1 | 4/2003 | Shinohara et al. | |
| 6,570,570 B1 | 5/2003 | Suzuki et al. | |
| 6,574,725 B1 | 6/2003 | Kranich et al. | |
| 6,577,762 B1 * | 6/2003 | Seeger et al. | 382/173 |
| 6,593,932 B2 | 7/2003 | Porterfield | |
| 6,614,847 B1 * | 9/2003 | Das et al. | 375/240.16 |
| 6,636,214 B1 | 10/2003 | Leather et al. | |
| 6,654,428 B1 * | 11/2003 | Bose et al. | 375/316 |
| 6,693,719 B1 | 2/2004 | Gupta et al. | |
| 6,697,063 B1 | 2/2004 | Zhu | |
| 6,717,583 B2 | 4/2004 | Shimomura et al. | |
| 6,734,861 B1 | 5/2004 | Van Dyke et al. | |
| 6,744,433 B1 | 6/2004 | Bastos et al. | |
| 6,792,575 B1 * | 9/2004 | Samaniego et al. | 715/202 |
| 6,807,620 B1 | 10/2004 | Suzuoki et al. | |
| 6,825,843 B2 | 11/2004 | Allen et al. | |
| 6,891,533 B1 | 5/2005 | Alcorn et al. | |
| 6,891,544 B2 | 5/2005 | Oka et al. | |
| 6,950,927 B1 | 9/2005 | Apisdorf et al. | |
| 6,952,213 B2 | 10/2005 | Ebihara | |
| 6,952,440 B1 * | 10/2005 | Underbrink | 375/150 |
| 6,958,718 B2 | 10/2005 | Symes et al. | |
| 6,964,009 B2 * | 11/2005 | Samaniego et al. | 715/202 |
| 6,972,769 B1 | 12/2005 | Nebeker et al. | |
| 6,999,076 B2 | 2/2006 | Morein | |
| 7,006,881 B1 * | 2/2006 | Hoffberg et al. | 700/83 |
| 7,015,913 B1 | 3/2006 | Lindholm et al. | |
| 7,015,914 B1 | 3/2006 | Bastos et al. | |
| 7,027,062 B2 | 4/2006 | Lindholm et al. | |
| 7,027,540 B2 * | 4/2006 | Wilson et al. | 375/354 |
| 7,030,878 B2 | 4/2006 | Xu et al. | |
| 7,034,828 B1 | 4/2006 | Drebin et al. | |
| 7,068,272 B1 | 6/2006 | Voorhies et al. | |
| 7,088,371 B2 | 8/2006 | Lippincott | |
| 7,098,922 B1 | 8/2006 | Bastos et al. | |
| 7,130,443 B1 * | 10/2006 | Werner et al. | 382/100 |
| 7,145,565 B2 | 12/2006 | Everitt et al. | |
| 7,146,486 B1 | 12/2006 | Prokopenko et al. | |
| 7,174,224 B2 * | 2/2007 | Hudson et al. | 700/1 |
| 7,196,708 B2 | 3/2007 | Dorojevets et al. | |
| 7,239,322 B2 | 7/2007 | Lefebvre et al. | |
| 7,239,735 B2 * | 7/2007 | Nozaki | 382/141 |
| 7,268,785 B1 | 9/2007 | Glanville et al. | |
| 7,339,592 B2 | 3/2008 | Lindholm et al. | |
| 7,358,502 B1 * | 4/2008 | Appleby et al. | 250/370.14 |
| 7,372,484 B2 * | 5/2008 | Mouli | 348/222.1 |
| 7,379,067 B2 * | 5/2008 | Deering et al. | 345/506 |
| 7,388,588 B2 | 6/2008 | D'Amora et al. | |
| 7,447,873 B1 | 11/2008 | Nordquist | |
| 7,557,832 B2 * | 7/2009 | Lindenstruth et al. | 348/208.99 |
| 7,574,042 B2 * | 8/2009 | Tsuruoka et al. | 382/169 |
| 7,583,294 B2 * | 9/2009 | Ray et al. | 348/222.1 |
| 7,612,803 B2 * | 11/2009 | Meitav et al. | 348/222.1 |
| 7,619,775 B2 * | 11/2009 | Kitamura et al. | 358/1.9 |
| 7,633,506 B1 | 12/2009 | Leather et al. | |
| 7,673,281 B2 * | 3/2010 | Yamanaka et al. | 716/53 |
| 7,683,962 B2 * | 3/2010 | Border et al. | 348/348 |
| 7,684,079 B2 * | 3/2010 | Takata et al. | 358/1.9 |
| 7,733,392 B2 * | 6/2010 | Mouli | 348/246 |
| 7,738,699 B2 * | 6/2010 | Tsuruoka et al. | 382/169 |
| 7,808,505 B2 * | 10/2010 | Deering et al. | 345/520 |
| 7,813,822 B1 * | 10/2010 | Hoffberg | 700/94 |
| 7,826,092 B2 * | 11/2010 | Ejima et al. | 358/2.1 |
| 7,904,187 B2 * | 3/2011 | Hoffberg et al. | 700/83 |
| 7,920,204 B2 * | 4/2011 | Miyanari | 348/362 |
| 7,966,078 B2 * | 6/2011 | Hoffberg et al. | 700/17 |
| 7,987,003 B2 * | 7/2011 | Hoffberg et al. | 700/17 |
| 8,046,313 B2 * | 10/2011 | Hoffberg et al. | 706/14 |
| 8,054,573 B2 * | 11/2011 | Mathew et al. | 360/75 |
| 8,154,818 B2 * | 4/2012 | Mathew et al. | 360/75 |
| 8,165,916 B2 * | 4/2012 | Hoffberg et al. | 705/14.53 |
| 2002/0091915 A1 | 7/2002 | Parady | |
| 2003/0034975 A1 | 2/2003 | Lindholm et al. | |
| 2003/0080959 A1 | 5/2003 | Morein | |
| 2003/0105793 A1 | 6/2003 | Guttag et al. | |
| 2003/0167379 A1 | 9/2003 | Soltis, Jr. | |
| 2003/0172234 A1 | 9/2003 | Soltis, Jr. | |
| 2004/0030845 A1 | 2/2004 | DeLano et al. | |
| 2004/0119710 A1 | 6/2004 | Piazza et al. | |
| 2004/0130552 A1 | 7/2004 | Duluk et al. | |
| 2004/0172631 A1 | 9/2004 | Howard | |
| 2004/0187119 A1 | 9/2004 | Janik et al. | |
| 2004/0246260 A1 | 12/2004 | Kim et al. | |
| 2005/0090283 A1 | 4/2005 | Rodriquez | |
| 2005/0184994 A1 | 8/2005 | Suzuoki et al. | |
| 2005/0195198 A1 | 9/2005 | Anderson et al. | |
| 2005/0206647 A1 | 9/2005 | Xu et al. | |
| 2006/0004942 A1 | 1/2006 | Hetherington et al. | |
| 2006/0020831 A1 | 1/2006 | Golla et al. | |
| 2006/0028482 A1 | 2/2006 | Donovan et al. | |
| 2006/0033735 A1 | 2/2006 | Seiler et al. | |
| 2006/0066611 A1 | 3/2006 | Fujiwara et al. | |
| 2006/0136919 A1 | 6/2006 | Aingaran et al. | |
| 2007/0030280 A1 | 2/2007 | Paltashev et al. | |
| 2007/0070075 A1 | 3/2007 | Hsu | |
| 2007/0185953 A1 | 8/2007 | Prokopenko et al. | |
| 2007/0236495 A1 | 10/2007 | Gruber et al. | |
| 2007/0252843 A1 | 11/2007 | Yu et al. | |
| 2007/0257905 A1 | 11/2007 | French et al. | |
| 2007/0268289 A1 | 11/2007 | Yu et al. | |
| 2007/0273698 A1 | 11/2007 | Du et al. | |
| 2007/0283356 A1 | 12/2007 | Du et al. | |
| 2007/0296729 A1 | 12/2007 | Du et al. | |
| 2008/0074433 A1 | 3/2008 | Jiao et al. | |

FOREIGN PATENT DOCUMENTS

| | | |
|---|---|---|
| EP | 0917056 A2 | 5/1999 |
| JP | 3185521 A | 8/1991 |
| JP | 9062852 A | 3/1997 |
| JP | 9231380 A | 9/1997 |
| JP | 2000057365 A | 2/2000 |
| JP | 2001222712 | 8/2001 |
| JP | 2001236221 A | 8/2001 |
| JP | 2001357410 A | 12/2001 |
| JP | 2002269583 | 9/2002 |
| JP | 2002529870 A | 9/2002 |
| JP | 2006099422 A | 4/2006 |
| RU | 2137186 C1 | 9/1999 |
| RU | 2004109122 | 6/2007 |
| TW | I230869 B | 4/2005 |
| TW | I230869 B | 4/2005 |
| WO | 0028482 A1 | 5/2000 |
| WO | WO0215000 A2 | 2/2002 |
| WO | WO02015000 A2 | 2/2002 |
| WO | WO2005086090 A2 | 9/2005 |
| WO | WO2005086090 A2 | 9/2005 |

OTHER PUBLICATIONS

Waldspurger et al., Register Relocation: Flexible Contexts for Multithreading. International Symposium on Computer Architecture, Proceedings of the 20th Annual International Symposium on Computer Architecture, 1993.

Deering M. et al: "The SAGE graphics architecture" Proceedings of the 29th Annual Conference on Computer Graphics and Interactive Techniques (SIGGRAPH'02), Jul. 23-26, 2002, San Antonio, Texas, USA, 2002, pp. 683-692, XP002534489.

Hadwiger M. et al: "Hardware-accelerated high-quality filtering on PC hardware" Proceedings of 2001 Conference on Vision, Modeling and Visualization, Nov. 21-23, 2001, Stuttgart, Germany, [Online] 2001, XP002534490 Retrieved from the Internet: URL:http://ww-

(56) References Cited

OTHER PUBLICATIONS wvis.informatik.uni-stuttgart.de/vmv01/d1/papers/8.pdf> [retrieved on Jun. 29, 2009].
Hopf Mi et al: "Accelerating 3D convolution using graphics hardware" Visualization '99. Proceedings San Francisco, CA, USA Oct. 24-29, 1999, Piscataway, NJ, USA, IEEE, US, Oct. 29, 1999, pp. 471-564, XP031385575 ISBN: 978-0-7803-5897-3.
Novasad J: "Advanced high quality filtering" Chapter 27 in book 'GPU-GEMS 2', [Online]. 2005, XP002534486 Retrieved from the Internet:. URL:http://http.developer.nvidia.com/GPUGems2/gpugems2_chapter27.html> [retrieved on Jun. 29, 2009].
Kilgariff et al.; "Chapter 30, The GeForce 6 Series GPU Architecture; " GPU Gems 2 Copyright 2005, pp. 471-491.
Lindholm et al.; "A User-Programmable Vertex Engine;" Aug. 12-17, 2001; ACM SIGGRAPH; pp. 149-158.
Bjorke K: "High quality filtering" Chapter 24 in Book 'GPU GEMS', [Online] 2004, XP002534488 Retrieved from the Internet: URL:http://http.developer.nvidia.com/GPUGems/gpugems_ch24.html> [retrieved on Jun. 29, 2009].
Blamer K et al.: "A Single Chip Multimedia Video Processor," Custom Integrated Circuits Conference, pp. 91-94, Proceedings of the IEEE (May 1994).
International Search Report and Written Opinion—PCT/US07/069663, International Search Authority—European Patent Office, Jul. 15, 2009.
Segal, M. et al.: "The OpenGL Graphics System: a Specification," pp. 1-368, Version 2.0 (Oct. 22, 2004).
Waldspurger et al., Register Relocation: Flexible Contexts for Multithreading, International Symposium on Computer Architecture, Proceedings of the 20th Annual International Symposium on Computer Architecture, 1993.
Deering M. et al: "The SAGE graphics architecture" Proceedings of the 29th Annual Conference on Computer Graphics and Interactive Techniques (SIGGRAPH'02), Jul. 23-26, 2002, San Antonio, Texas, USA, 2002, pp. 683-692. XP002534489.
Hadwiger M. et al: "Hardware-accelerated high-quality filtering on PC hardware" Proceedings of 2001 Conference on Vision, Modelling and Visualization, Nov. 21-23, 2001, Stuttgart, Germany, [Online] 2001, XP002534490 Retrieved from the Internet: <URL:http://ww-wvis.informatik.uni-stuttgart.de/vmv01/d1/papers/8.pdf> [retrieved on Jun. 29, 2009].
Hopf Mi et al: "Accelerating 3D convolution using graphics hardware" Visualization '99. Proceedings San Francisco, CA, USA Oct. 24-29, 1999, Piscataway, NJ, USA, IEEE, US, Oct. 29, 1999, pp. 471-564. XP031335575 ISBN: 978-0/7803-5897-3.
Novasad J: "Advanced high quality filtering" Chapter 27 in Book 'GPU-Gems 2', [Online]. 2005, XP002534486 Retrieved from the Internet: URL:http//http.developer.nvidia.com/GPUGems2/gpugems2_chapter27.html> [retrieved on Jun. 29, 2009].
Owens J.D et al: "A survey of general-purpose computation on graphics hardware" Computer Graphics Forum, vol. 26, No. 1, Mar. 2007, pp. 80-113, XP002534491.
Sigg C. et al: "Fast third-order texture filtering" Chapter 20 in Book 'GPU Gems 2', [Online] 2005, XP002534487 Retrieved from the Internet: URL:http://http.developer.nvidia.com/GPUGems2/gpugems2_chapter20.html> [retrieved on Jun. 29, 2009].
Kilgariff et al.; "Chapter 30, The GeForce 6 Series GPU Architecture;" GPU Gems, Copyright 2005; pp. 471-491.
Lindholm at al.; "A User-Programmable Vertex Engine;" Aug. 12-17, 2001; ACM SIGGRAPH; pp. 149-158.
Wynn, Chris; "nVIDIA OpenGL Vertex Programming on Future-Generation GPUs;" May 8, 2004; Nvidia Corporation; pp. 1-97.
Akkary, H. And Driscoll, M. A. 1998. A dynamic multithreading processor. In Proceedings of the 31st Annual ACM/IEEE international Symposium on Microarchitecture (Dallas, Texas, United States). International Symposium on Microarchitecture. IEEE Computer So. 1998, pp. 226- 236.
Kenji Watanabe, Wanming Chu, Yamin Li, "Exploiting Java Instruction/Thread Level Parallelism with Horizontal Multithreading," Australasian Computer Systems Architecture Conference, p. 122, 6th Australasian Computer Systems Architecture Conference (AustCSA.) IEEE 2001, pp. 122-129.
Ying Chen, Resit Sendag, David J. Lilja, "Using Incorrect Speculation to Prefetch Data in a Concurrent Multithreaded Processor," Parallel and Distributed Processing Symposium, International, p. 76b, International Parallel and Distributed Processing Sympos., IEEE 2003, pp. 1-9.
Translation of Office Action in Japanese application 2009-511215 corresponding to U.S. Appl. No. 11/435,454, citing WO05086090, US20030080959 and JP2001222712 dated Feb. 22, 2011.
Hiroaki Hirata, and 4 others, "An elementary processor Architecture with Parallel Instruction Issuing from Multiple Threads," Information Processing Society article magazine, Information Processing Society of Japan, 1993, vol. 34, No. 4, pp. 595-605.
Sohn, et al., "A 155-mW 50-Mvertices/s Graphics Processor With Fixed-Point Programmable Vertex Shader for Mobile Applications," IEEE Journal of Solid-State Circuits, vol. 41, No. 5, May 2006, pp. 1081-1091.
Onoue, M., et al., "3D Image Handbook", 1st ed., Asakura Publishing Co., Ltd. (Kunizou Asakura), Feb. 20, 2006, pp. 152-170.

\* cited by examiner

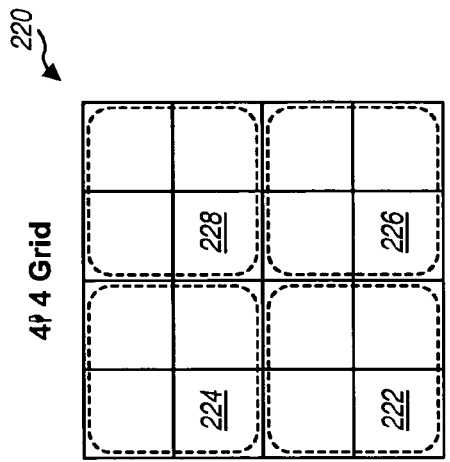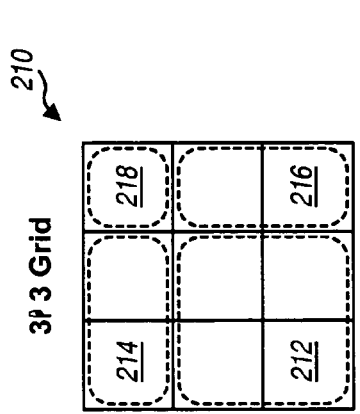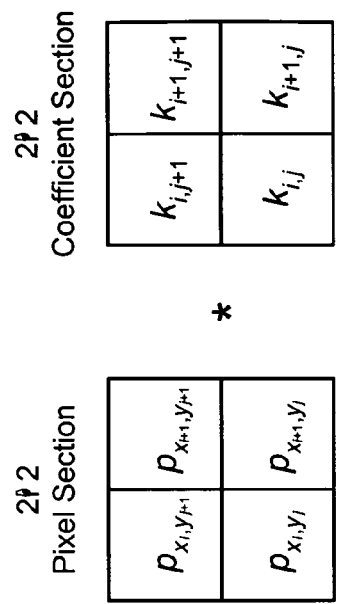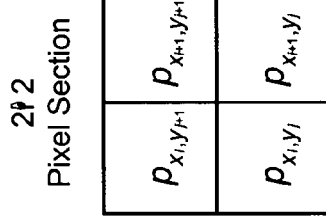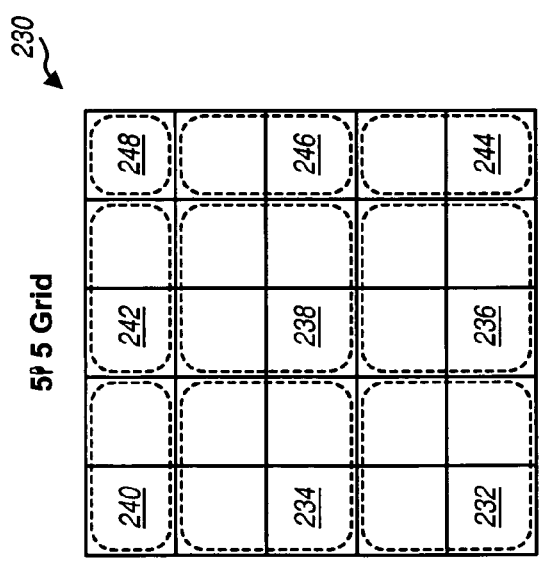

CONVOLUTION FILTERING IN A GRAPHICS PROCESSOR

BACKGROUND

I. Field

The present disclosure relates generally to circuits, and more specifically to a graphics processor.

II. Background

Graphics processors are widely used to render 2-dimensional (2-D) and 3-dimensional (3-D) images for various applications such as video games, graphics, computer-aided design (CAD), simulation and visualization tools, imaging, etc. A graphics processor may perform various graphics operations to render an image. One such graphics operation is convolution filtering, which is commonly used in image processing, 3-D post processing, 2-D imaging operations, etc. Convolution filtering may be used to obtain effects such as edge sharpening, blurring, noise reduction, etc. Convolution filtering may also be used for scaling, rotation, texture mapping, etc.

For convolution filtering, an H×W grid of picture elements (pixels) is multiplied element-by-element with an H×W grid of convolution coefficients, where H is the height and W is the width of each grid. H·W intermediate results from the element-by-element multiplies are accumulated to obtain a final result for one pixel position. The same convolution computation may be repeated for many (e.g., all) pixel positions in an image. The convolution computation for one pixel position requires H·W multiply and accumulate operations. Hence, a large number of arithmetic operations may be performed for convolution filtering of the image.

Some high-end graphics processors utilize dedicated hardware to handle the large number of arithmetic operations for convolution filtering. The dedicated hardware may be cost prohibitive for many applications. Furthermore, the dedicated hardware is typically designed for a specific grid size and may not efficiently handle convolution filtering of other grid sizes.

SUMMARY

Techniques for performing convolution filtering using hardware normally available in a graphics processor are described herein. In an embodiment, convolution filtering of an arbitrary H×W grid of pixels is achieved by partitioning the grid into smaller sections, performing computation for each section, and combining the intermediate results for all sections to obtain a final result. The partitioning of the H×W grid, the convolution computation, and the final combining may be performed in various manners and by various entities.

In an embodiment, which may be performed by a compiler or some other entity, a command to perform convolution filtering on a grid of pixels with a kernel of coefficients is received, e.g., from a graphics application. The grid is partitioned into multiple sections, where each section may be 2×2 or smaller. Multiple instructions are generated for the multiple sections, with each instruction performing convolution computation on at least one pixel in one section. Each instruction may include pixel position information and applicable kernel coefficients. Instructions to combine the intermediate results from the multiple instructions are also generated.

In another embodiment, which may be performed by a graphics processor or some other entity, a set of instructions for convolution filtering of a grid of pixels is received. Instructions in the set are dispatched, e.g., one instruction at a time. Convolution computation is performed on at least one pixel in the grid for each dispatched instruction to obtain an intermediate result for the instruction. Intermediate results from the dispatched instructions are received and combined to generate a final result for the convolution filtering. A shader core may dispatch the instructions and combine the intermediate results. A texture engine may perform the convolution computation for each dispatched instruction.

In yet another embodiment, which may be performed by a graphics system or some other entity, a command/instruction is received to perform convolution filtering on a grid of pixels with a kernel of coefficients in accordance with one of multiple modes. If a first mode is selected, then the pixels in the grids are multiplied with closest coefficients in the kernel. If a second mode is selected, then the pixels in the grids are multiplied with interpolated coefficients derived from the coefficients in the kernel.

Various aspects and embodiments of the invention are described in further detail below.

BRIEF DESCRIPTION OF THE DRAWINGS

Aspects and embodiments of the invention will become more apparent from the detailed description set forth below when taken in conjunction with the drawings in which like reference characters identify correspondingly throughout.

FIGS. 2A through 2D show partitioning of different grids into smaller sections.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
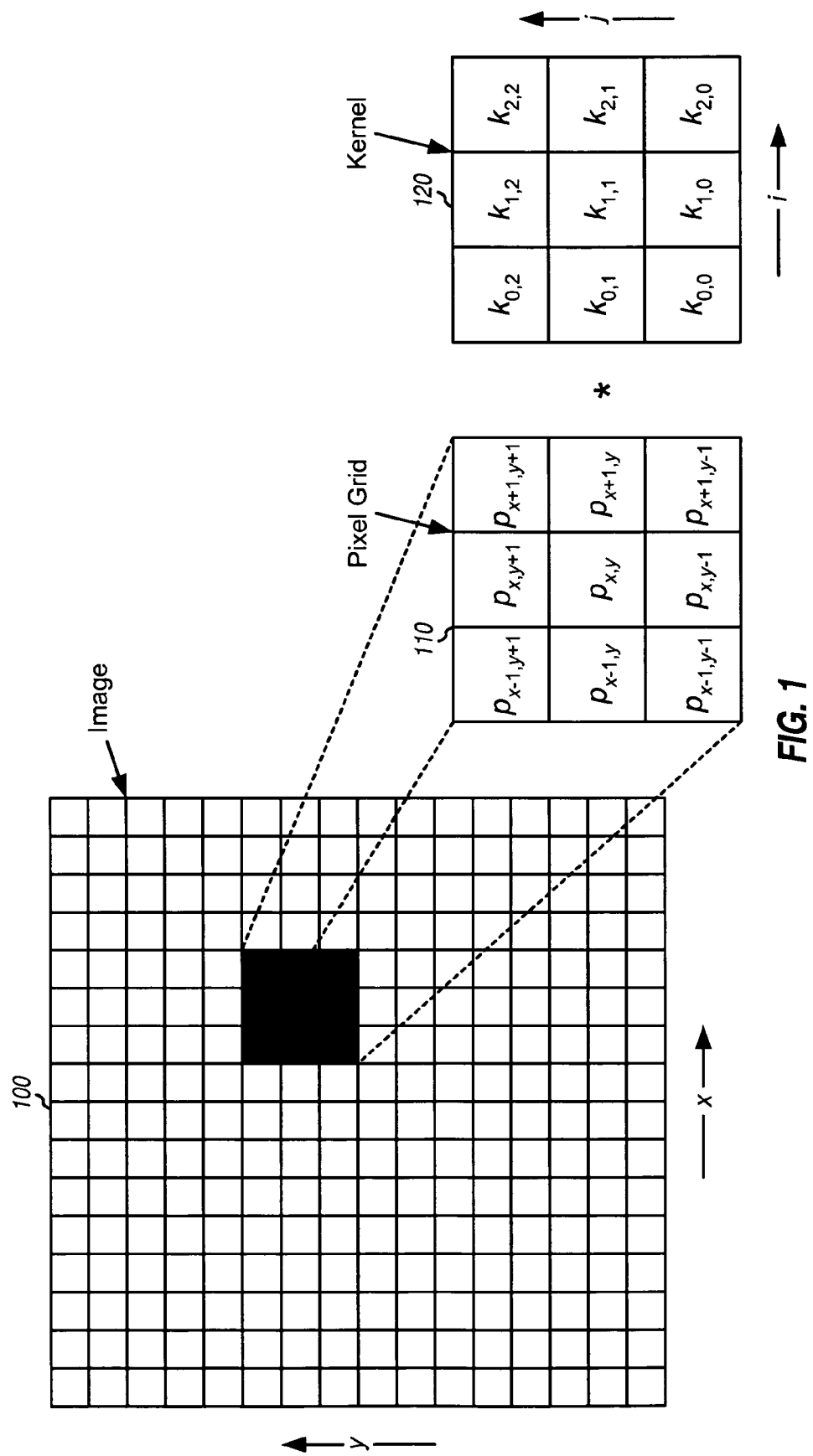
FIG. 1 shows convolution filtering of a grid within an image.

FIG. 1 shows convolution filtering of a grid within an image 100. In general, image 100 may include any number of pixels in the horizontal (x) direction and any number of pixels in the vertical (y) direction. Coordinates x and y may also be referred to as u and v (e.g., in texture mapping) or by some other nomenclature. The origin of the image may be at the lower left corner, as shown in FIG. 1, or some other corner. In the example shown in FIG. 1, convolution filtering is performed on a 3×3 grid 110 of nine pixels $p_{x-1,y-1}$ through $p_{x+1,y+1}$ with a 3×3 kernel 120 of nine coefficients $k_{0,0}$ through $k_{2,2}$ to generate a new pixel at position (x,y). A convolution kernel is a set of coefficients used for convolution filtering. The coefficients may also be referred to as weights.

Convolution filtering may be classified into two types—general and separable. For general convolution filtering, the kernel coefficients are functions of both x and y, and the horizontal and vertical directions are not divisible. For separable convolution filtering, the kernel coefficients are functions of either x or y, and the horizontal and vertical directions are divisible.

General convolution filtering may be expressed as:

$$p'_{x,y} = S \cdot \left( \sum_{i=0}^{W-1} \sum_{j=0}^{H-1} k_{i,j} \cdot p_{x+i-shiftX, y+i-shiftY} \right) + b, \quad \text{Eq (1)}$$

where W is the width of the grid/kernel and H is the height of the grid, $k_{i,j}$ is a kernel coefficient at position (i, j) in the grid, S is a scaling factor and b is a bias value, $p_{x,y}$ is an original pixel at position (x, y) in the image, $p'_{x,y}$ is a filtered pixel that replaces the original pixel at position (x, y), shiftX is an offset from position (x, y) to the left of the grid, and shiftY is an offset from position (x, y) to the bottom of the grid.

S may be a normalization factor of $$S = \left( \sum_{i=0}^{W-1} \sum_{j=0}^{H-1} k_{i,j} \right)^{-1}$$

or some other value.

Separable convolution filtering may be expressed as:

$$p'_{x,y} = S \cdot \left( \sum_{i=0}^{W-1} \sum_{j=0}^{H-1} k_i \cdot k_j \cdot p_{x+i-shiftX, y+i-shiftY} \right) + b, \quad \text{Eq (2)}$$

where $k_i$ is a kernel coefficient at horizontal position i in the grid, and $k_j$ is a kernel coefficient at vertical position j in the grid. The kernel coefficient at position (i, j) may be derived as: $k_{i,j} = k_i \cdot k_j$.

In the example shown in FIG. 1, W=3, H=3, shiftX=1, and shiftY=1. In general, shiftX is approximately half of the width, and shiftY is approximately half of the height. ShiftX may be defined as shiftX=⌊(W−1)/2⌋ and ShiftY may be defined as shiftY=⌊(H−1)/2⌋, where ⌊a⌋ denotes a floor operator that gives the next lower integer value for a.

Different types of convolution filtering and different kernels may produce different effects in the filtered image. A graphics application may select the type of convolution filtering to perform and the kernel to use based on image processing quality and feature requirements.

In general, the kernel and the pixel grid may have any H×W dimension, where H≥1 and W≥1. For example, the kernel size may range from 3×3 to 16×16 or even larger. Convolution filtering may be performed with dedicated hardware. However, this solution may be cost prohibitive for many applications.

In an embodiment, convolution filtering is performed using a shader core and a texture engine that are commonly available in many modern graphics processors used in personal computers, laptops, and wireless devices (e.g., cellular phones). The shader core may include an arithmetic logic unit (ALU) capable of performing multiply and add operations for graphics functions such as shading. The texture engine may also include an ALU used for graphics functions such as texture mapping. The ALUs in the shader core and the texture engine may be used to perform convolution filtering in an efficient and cost effective manner, as described below.

In an embodiment, convolution filtering of an arbitrary H×W pixel grid is achieved by partitioning the grid into smaller sections, performing computation for each section, and combining the intermediate results for all sections to obtain a final result. The size of the section may be selected based on the processing capabilities of the ALU(s) used for computation. In general, any section size may be used, e.g., 1×2, 2×2, 2×3, 3×3, etc. For clarity, much of the description below is for an embodiment in which the section size is 2×2 or smaller.

FIG. 2A shows an exemplary partitioning of a 3×3 grid 210 into smaller sections. In this example, the 3×3 grid is partitioned into a 2×2 section 212 covering the lower left corner of the grid, a 1×2 section 214 covering the upper left corner, a 2×1 section 216 covering the lower right corner, and a 1×1 section 218 covering the upper right corner. The 3×3 grid may also be partitioned into smaller sections in other manners. For example, the 2×2 section may cover the upper left corner, the lower right corner, or the upper right corner of the grid. In the example shown in FIG. 2A, the four sections 212 through 218 have different width and height dimensions.

FIG. 2B shows an exemplary partitioning of a 4×4 grid 220 into smaller sections. In this example, the 4×4 grid is partitioned into four 2×2 sections 222, 224, 226 and 228 covering the four corners of the grid.

FIG. 2C shows an exemplary partitioning of a 5×5 grid 230 into smaller sections. In this example, the 5×5 grid is partitioned into four 2×2 sections 232, 234, 236 and 238, two 1×2 sections 240 and 242, two 2×1 sections 244 and 246, and one 1×1 section 248.

In general, an arbitrary H×W grid may be partitioned into any number of 1×1, 1×2, 2×1 and 2×2 sections. H may be equal to W or may be different from W. The partitioning may start from the lower left corner of the grid as shown in FIGS. 2A through 2C or at other corners.

FIG. 2D shows four kernel coefficients and four pixels in a 2×2 section within an H×W grid. This 2×2 section has its lower left corner located at position (i, j) in the H×W grid. Each section in the H×W grid has a different set of i and j values. For example, i=0 and j=0 for section 232 in FIG. 2C, i=0 and j=2 for section 234, i=2 and j=0 for section 236, etc. The four kernel coefficients in the 2×2 section are denoted as $k_{i,j}$, $k_{i+1,j}$, $k_{i,j+1}$ and $k_{i+1,j+1}$. The four pixels are denoted as $p_{x_i,y_j}$, $p_{x_{i+1},y_j}$, $p_{x_i,y_{j+1}}$ and $p_{x_{i+1},y_{j+1}}$.

In an embodiment, the $(x_i, y_j)$ position of each pixel in the H×W grid is given directly and may be expressed as:

$x_i = x+i-\text{shift}X$, for $i=0, \ldots, W-1$, and  Eq(3)

$y_j = y+j-\text{shift}Y$, for $j=0, \ldots, H-1$.  Eq(4)

In another embodiment, the $(x_i, y_j)$ position of each pixel is given indirectly by an x offset and a y offset from a reference position. This reference position may be the (x, y) position of the filtered pixel in the H×W grid (e.g., pixel $p_{x,y}$ in FIG. 1), the position of the pixel in the lower left corner of the grid (e.g., pixel $p_{x-1,y-1}$ in FIG. 1), etc. If the reference position is (x, y), then the x and y offsets for each pixel in the H×W grid may be expressed as:

$ox_i = i-\text{shift}X$, for $i=0, \ldots, W-1$, and  Eq(5)

$oy_j = j-\text{shift}Y$, for $j=0, \ldots, H-1$,  Eq(6)

where $ox_i$ is the x offset for horizontal position i in the grid, and $oy_j$ is they offset for vertical position j in the grid.

ShiftX and shiftY in equations (3) through (6) may be integer or real values. In an embodiment, the x and y offsets for the pixels in the H×W grid are precomputed and stored in an offset table.

The $(x_i, y_j)$ position of each pixel in the H×W grid may then be expressed as:

$$x_i = x + ox_i, \text{ for } i = 0, \ldots, W-1, \text{ and} \quad \text{Eq(7)}$$

$$y_j = y + oy_j, \text{ for } j = 0, \ldots, H-1. \quad \text{Eq(8)}$$

The convolution computation for the 2×2 section may be expressed as:

$$r_{i,j} = k_{i,j} \cdot p_{x_i, y_j} + k_{i+1,j} \cdot p_{x_{i+1}, y_j} + k_{i,j+1} \cdot p_{x_i, y_{j+1}} + k_{i+1,j+1} \cdot p_{x_{i+1}, y_{j+1}}, \quad \text{Eq(9)}$$

where $r_{i,j}$ is the intermediate result for the 2×2 section. The computation in equation (9) may be efficiently performed by an ALU with four units, e.g., a quad ALU that can compute an inner product of two 4×1 vectors or four scalar ALUs that can multiply and accumulate four pairs of scalars.

The convolution computation for a 1×1, 1×2 or 2×1 section includes a subset of the coefficients and a subset of the pixels shown in equation (9). In an embodiment, a 4-bit pixel mask is used to identify the section size. Each bit in the pixel mask is associated with one pixel in the 2×2 section and indicates whether or not to include that pixel in the convolution computation.

In an embodiment, one instruction is generated for each section of the H×W grid. For example, four instructions may be generated for a 3×3 or 4×4 grid, nine instructions may be generated for a 5×5 or 6×6 grid, etc. In an embodiment, each instruction includes up to four kernel coefficients and up to four pixels in the section covered by that instruction. In another embodiment, each instruction includes up to four kernel coefficients and up to four pixel positions for the section covered by that instruction. Up to four pixels may then be retrieved for up to four pixel positions included in the instruction. In yet another embodiment, each instruction includes up to four kernel coefficients, a reference position, and x and y offsets for up to four pixel positions in the section covered by that instruction. Up to four pixel positions may be computed based on the reference position and the x and y offsets, and up to four pixels may then be retrieved for the computed pixel position(s). In all embodiments, convolution computation may be performed on the pixel(s) in each section with the kernel coefficient(s), e.g., as shown in equation (9), to generate an intermediate result for the section. The intermediate results for all instructions may be accumulated to generate a final result for the H×W grid.

Equations (1) through (9) assume that the pixels and the kernel coefficients are given in the same x, y coordinate system. In this case, a pixel at position (x, y) may be multiplied with a kernel coefficient that is applicable for that (x, y) position.

In general, the coordinate system for the pixels may or may not match the coordinate system for the kernel coefficients. Furthermore, the x and y values for a given pixel may be integer values or real values. For example, convolution filtering may be performed on texture pixels (texels) given in (u, v) coordinate system that may not match the (x, y) coordinate system of the image. If the coordinate values for a pixel are real values having an integer portion and a fractional portion, then the coefficient to apply to the pixel may be determined in several manners. In one embodiment, which is also referred to as a snap-to-nearest embodiment, the coordinate values for the pixel are rounded to the nearest integer values, and the kernel coefficient at the rounded coordinate values is applied to the pixel. In another embodiment, which is also referred to as an interpolated embodiment, four kernel coefficients closest to the pixel are used to generate an interpolated coefficient, which is then applied to the pixel.

Figure 3A:
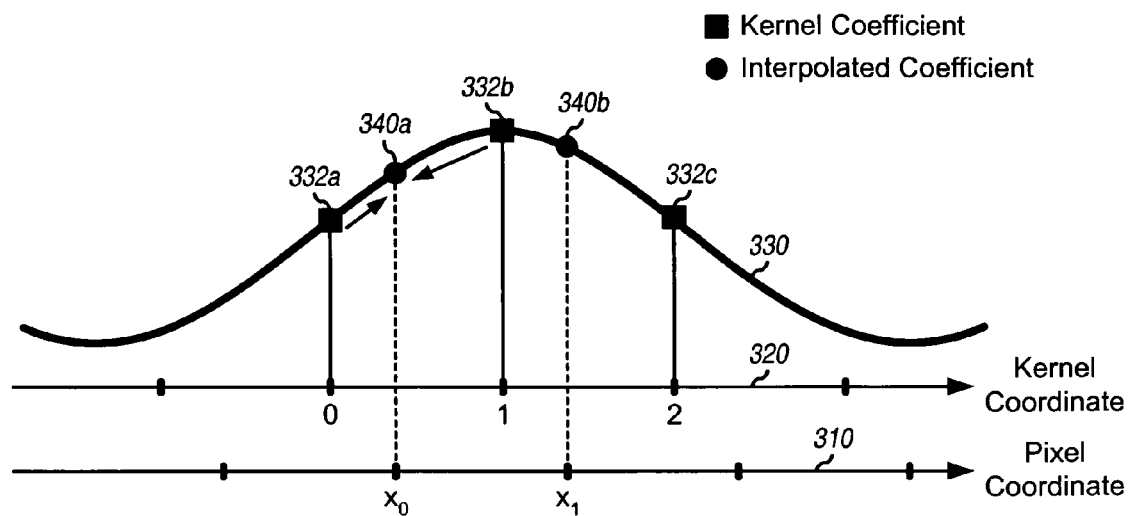
FIGS. 3A and 3B show interpolation in 1 and 2 dimensions, respectively.

FIG. 3A illustrates two embodiments of determining coefficients for pixels in one direction, e.g., the horizontal direction. In this example, the x coordinate used for pixels is given by a line 310, and the x coordinate used for kernel coefficients is given by a line 320. Three kernel coefficients 332a, 332b and 332c are generated from a filter function 330 at three kernel coordinate values of 0, 1 and 2. Two pixels 340a and 340b are shown at two pixel coordinate values of $x_0$ and $x_1$. In the snap-to-nearest embodiment, the coordinate value of $x_0$ for pixel 340a is rounded to the nearest kernel coordinate value of 0, and kernel coefficient 332a is applied to pixel 340a. In the interpolated embodiment, two kernel coefficients 332a and 332b closest to the pixel coordinate value of $x_0$ are used to generate an interpolated coefficient at $x_0$, which is then applied to pixel 340a. The coefficient for pixel 340b may be determined in the same manner as the coefficient for pixel 340a.

Figure 3B:
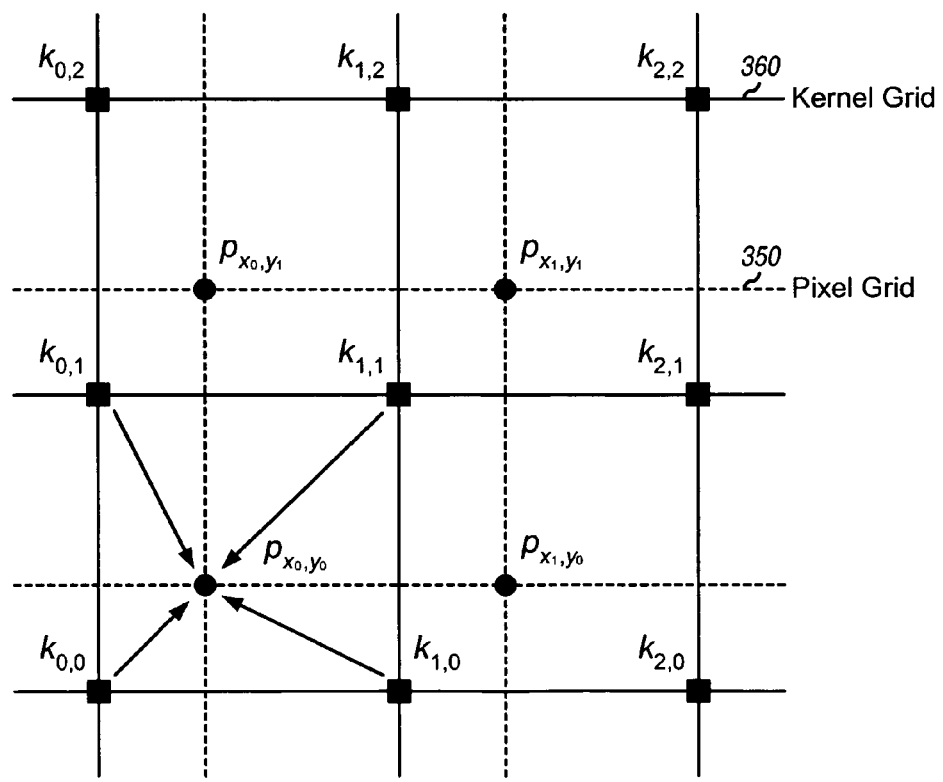

FIG. 3B illustrates two embodiments of determining coefficients for pixels in both x and y directions. In this example, the (x, y) coordinate used for pixels is given by a dashed grid 350, and the (x, y) coordinate used for kernel coefficients is given by a solid grid 360. Nine kernel coefficients $k_{0,0}$ through $k_{2,2}$ are generated for nine kernel positions (0, 0) through (2, 2). Four pixels $p_{x_0,y_0}$ through $p_{x_1,y_1}$ are shown at four pixel positions $(x_0, y_0)$ through $(x_1, y_1)$. In the snap-to-nearest embodiment, the position $(x_0, y_0)$ of pixel $p_{x_0,y_0}$ is rounded to the nearest kernel position (0, 0), and kernel coefficient $k_{0,0}$ is applied to pixel $p_{x_0,y_0}$. In the interpolated embodiment, four kernel coefficients $k_{0,0}$, $k_{1,0}$, $k_{0,1}$ and $k_{1,1}$ closest to pixel position $(x_0, y_0)$ are used to generate an interpolated coefficient at $(x_0, y_0)$, which is then applied to pixel $p_{x_0,y_0}$. The coefficients for the other pixels may be determined in the same manner as the coefficient for pixel $p_{x_0,y_0}$.

The $(x_i, y_j)$ positions of the pixels in the H×W grid may thus be used to determine the coefficients for these pixels. In an embodiment, the $(x_i, y_j)$ position of each pixel is given directly by an $x_i$ value and a $y_j$ value, which may be computed as shown in equations (3) and (4). In this embodiment, the positions of four pixels in a 2×2 section may be given by four sets of $x_i$ and $y_j$ values. In another embodiment, the $(x_i, y_j)$ position of each pixel is given indirectly by x and y offsets, which may be computed as shown in equations (5) and (6). In this embodiment, the positions of four pixels in a 2×2 section may be given by one set of x and y values for the reference position, two x offset values, and two y offset values. The following description assumes the use of this embodiment.

In an embodiment, two modes of convolution filtering are supported—mode 0 and mode 1. In an embodiment, mode 0 performs convolution computation on sections of up to four pixels using snap-to-nearest coefficients. Mode 0 provides fast results and may be used for many convolution applications. In an embodiment, mode 1 performs convolution computation on each pixel using an interpolated coefficient generated from four kernel coefficients. Mode 1 may be used for applications desiring higher quality, e.g., 3-D applications.

In an embodiment, an instruction for mode 0 includes the following:

Reference position (x, y),

Two x offsets $ox_i$ and $ox_{i+1}$ and two y offsets $oy_j$ and $oy_{j+1}$ for four pixels, Up to four kernel coefficients $k_{i,j}$, $k_{i+1,j}$, $k_{i,j+1}$ and $k_{i+1,j+1}$ for the four pixels, 4-bit pixel mask indicating which pixel(s) to perform convolution computation, and Mode bit set to 0.

For mode 0, the positions of the four pixels may be computed as follows:

$$(x_i, y_j) = (x + ox_i, y + oy_j), \quad \text{Eq(10)}$$

$$(x_{i+1}, y_j) = (x + ox_{i+1}, y + oy_j), \quad \text{Eq(11)}$$

$$(x_i, y_{j+1}) = (x + ox_i, y + oy_{j+1}), \text{ and} \quad \text{Eq(12)}$$

$$(x_{i+1}, y_{j+1}) = (x + ox_{i+1}, y + oy_{j+1}). \quad \text{Eq(13)}$$

The four pixel positions in equations (10) through (13) may be rounded to the nearest integer values. Up to four pixels at the rounded positions may be retrieved from memory and applied with up to four kernel coefficients included in the mode 0 instruction.

In an embodiment, an instruction for mode 1 includes the following:

Reference position (x, y),

One x offset $ox_i$ and one y offset $oy_j$ for one pixel,

Four kernel coefficients $k_{i,j}$, $k_{i+1,j}$, $k_{i,j+1}$ and $k_{i+1,j+1}$ for one pixel, and Mode bit set to 1.

For mode 1, the position $(x_i, y_j)$ of the pixel may be computed as shown in equation (10). The four kernel coefficients $k_{i,j}$, $k_{i+1,j}$, $k_{i,j+1}$ and $k_{i+1,j+1}$ included in the mode 1 instruction are kernel coefficients closest to position $(x_i, y_j)$. These kernel coefficients are used to generate an interpolated coefficient $k_{x_i,y_j}$ at position $(x_i, y_j)$. For bilinear interpolation, kernel coefficients $k_{i,j}$ and $k_{i+1,j}$ may be interpolated to generate a coefficient $k_{x_i,j}$ at position $(x_i, j)$, kernel coefficients $k_{i,j+1}$ and $k_{i+1,j+1}$ may be interpolated to generate a coefficient $k_{x_i,j+1}$ at position $(x_i, j+1)$, and coefficients $k_{x_i,j}$ and $k_{x_i,j+1}$ may be interpolated to generate the interpolated coefficient $k_{x_i,y_j}$ at position $(x_i, y_j)$. Bilinear interpolation may be performed in the x direction followed by the y direction, as described above, or in the y direction followed by the x direction. For pixels at the edges of the H×W grid, kernel coefficients may be repeated, if necessary, to obtain four kernel coefficients for each edge pixel.

A bilinear ALU may perform the following computation:

$$r = w_{0,0} \cdot q_{i,j} + w_{0,1} \cdot q_{i,j+1} + w_{1,0} \cdot q_{i+1,j} + w_{1,1} \cdot q_{i+1,j+1}. \quad \text{Eq(14)}$$

For a mode 0 instruction, $w_{0,0}$ through $w_{1,1}$ may correspond to four kernel coefficients, $q_{i,j}$ through $q_{i+1,j+1}$ may correspond to four pixel values, and r is the intermediate result for the mode 0 instruction.

For a mode 1 instruction, $w_{0,0}$ through $w_{1,1}$ may be interpolation weights, which may be expressed as:

$$w_{0,0} = (1-xf) \cdot (1-yf), \quad \text{Eq(15)}$$

$$w_{0,1} = (1-xf) \cdot yf, \quad \text{Eq(16)}$$

$$w_{1,0} = xf \cdot (1-yf), \text{ and} \quad \text{Eq(17)}$$

$$w_{1,1} = xf \cdot yf, \quad \text{Eq(18)}$$

where xf is a factional portion of the x value for a pixel being operated on by the mode 1 instruction and yf is a factional portion of the y value for the pixel. $q_{i,j}$ through $q_{i+1,j+1}$ may correspond to four kernel coefficients multiplied with the pixel value. The multiplication of the kernel coefficients with the pixel value may be performed prior to the bilinear ALU, e.g., by using a multiplier for another graphics function such as 3-D graphics filtering, tri-linear and anisotropic filtering, etc. The computation for mode 0 and mode 1 may also be performed in other manners.

Different and/or additional modes may also be supported. For example, mode 0 may be extended to support convolution computation for two sections that are smaller than 2×2 sections.

In an embodiment, convolution filtering of an H×W grid is performed using either mode 0 or mode 1. A sufficient number of mode 0 or mode 1 instructions are generated for all of the pixels in the H×W grid. Each instruction includes the parameters described above and provides an intermediate result for the pixel(s) covered by that instruction. The intermediate results from all instructions may be accumulated to obtain the final result for the H×W grid.

Convolution filtering may be performed with various graphics processor architectures. The storage of the pixels and kernel coefficients, the computation of the pixel positions, the interpolation of the coefficients, the multiplication of the pixels with the coefficients, and the accumulation of the intermediate results may be performed in various manners depending on the graphics processor architecture. For clarity, convolution filtering is described below for a specific graphics processor architecture.

Figure 4:
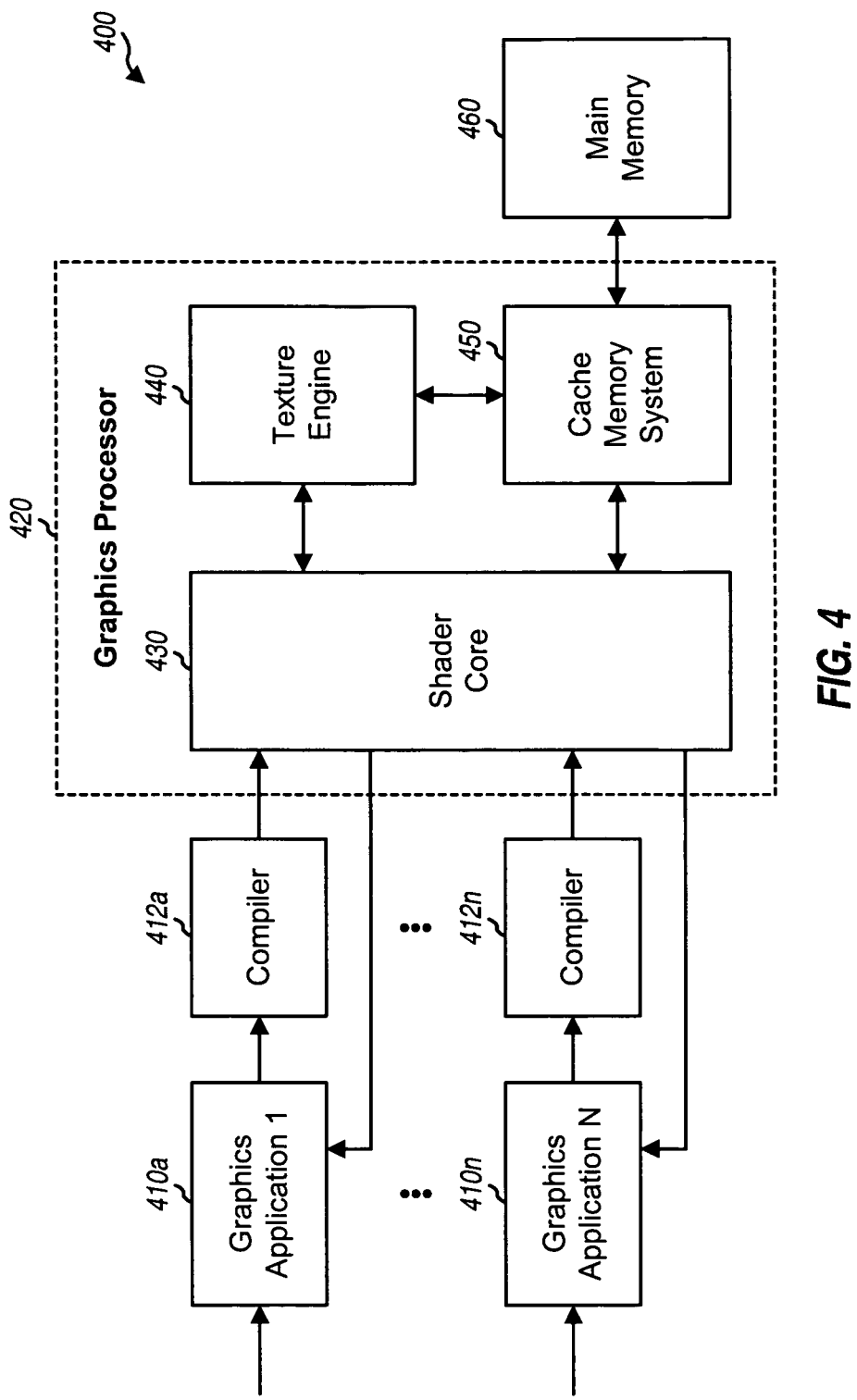
FIG. 4 shows a block diagram of a graphics system.

FIG. 4 shows a block diagram of a graphics system 400 that supports N graphics applications/programs 410a through 410n, where in general N≥1. Graphics system 400 may be a stand-alone system or part of a larger system such as a computing system, a wireless communication device, etc. Graphics applications 410a through 410n may be for video games, graphics, etc., and may run concurrently.

Compilers 412a through 412n receive and compile image rendering and/or processing programs from graphics applications 410a through 410n, respectively, and generate instructions for these programs. Compilers 412 may be on-line compilers that compile the programs from graphics applications 410 in real-time. Compilers 412 may also be off-line compilers that compile the programs at compile time and produce instructions for execution at a subsequent time. A graphics application may generate a command for convolution filtering of an H×W grid, and a compiler may split the convolution filtering into multiple sections and generate related instructions.

A graphics processor 420 performs processing for graphics applications 410a through 410n. Graphics processor 420 may split image rendering and/or processing into a series of threads, e.g., automatically and transparent to graphics applications 410 and compilers 412. A thread (or thread of execution) indicates a specific task that may be performed with a set of one or more instructions. Threads allow a graphics application to have multiple tasks performed simultaneously by different units and further allow different graphics applications to share resources. In the embodiment shown in FIG. 4, graphics processor 420 includes a shader core 430, a texture engine 440, and a cache memory system 450. A core generally refers to a processing unit within an integrated circuit. The terms "core", "engine", "machine", "processor" and "processing unit" are often used interchangeably. Shader core 430 may perform graphics operations such as shading, which is a highly complex graphics operation involving lighting, shadowing, etc. Texture engine 440 may perform graphics operations such as texture mapping. Texturing is achieved by modifying the color of each pixel with the color of a texture image at the location indicated by that pixel's texture coordinates. Cache memory system 450 may include one or more caches, which are fast memories that can store data and instructions for shader core 430 and texture engine 440.

Graphics processor 420 may include other processing and control units, engines, and memories. For example, graphics processor 420 may include one or more additional engines that perform triangle setup, rasterization, stencil and depth tests, attribute setup, pixel interpolation, etc. The various graphics operations described herein are known in the art. Graphics processor 420 may implement a software interface such as Open Graphics Library (OpenGL), Direct3D, etc. OpenGL is described in a document entitled "The OpenGL® Graphics System: A Specification," Version 2.0, dated Oct. 22, 2004, which is publicly available.

A main memory 460 is a large, slower memory located further away (e.g., off-chip) from graphics processor 420. Main memory 460 stores data and instructions that may be loaded into the caches within cache memory system 450.

Figure 5:
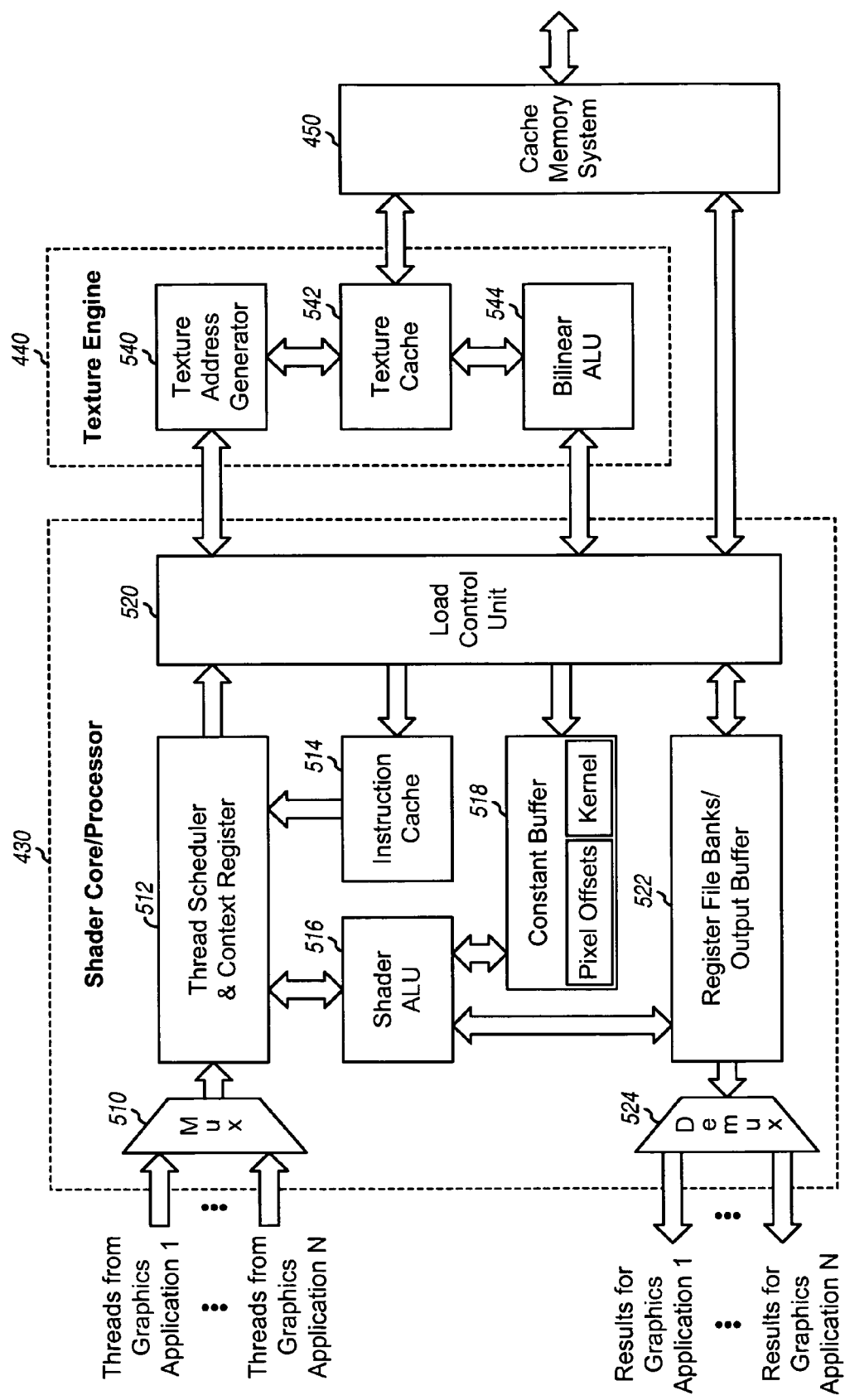
FIG. 5 shows a block diagram of a shader core and a texture engine.

FIG. 5 shows a block diagram of an embodiment of shader core 430 and texture engine 440 in FIG. 4. Within shader core 430, a multiplexer (Mux) 510 receives threads from graphics applications 410a through 410n and provides these threads to a thread scheduler and context register 512. Thread scheduler 512 performs various functions to schedule and manage execution of threads. Thread scheduler 512 determines whether to accept new threads, creates a register map table for each accepted thread, and allocates resources to the threads. The register map table indicates mapping between logical register address to physical register file address. For each thread, thread scheduler 512 determines whether resources required for that thread are ready, pushes the thread into a sleep queue if any resource (e.g., instruction, register file, or texture read) for the thread is not ready, and moves the thread from the sleep queue to an active queue when all of the resources are ready. Thread scheduler 512 interfaces with a load control unit 520 in order to synchronize the resources for the threads.

Thread scheduler 512 also manages execution of threads. Thread scheduler 512 fetches the instruction(s) for each thread from an instruction cache 514, decodes each instruction if necessary, and performs flow control for the thread. Thread scheduler 512 selects active threads for execution, checks for read/write port conflict among the selected threads and, if there is no conflict, sends instruction(s) for one thread to an ALU 516 and sends instruction(s) for another thread to load control unit 520. Thread scheduler 512 maintains a program/instruction counter for each thread and updates this counter as instructions are executed or program flow is altered. Thread scheduler 512 also issues requests to fetch missing instructions and removes threads that are completed.

Instruction cache 514 stores instructions for the threads, e.g., instructions for convolution filtering. These instructions indicate specific operations to be performed for each thread. Each operation may be an arithmetic operation, an elementary function, a memory access operation, etc. Instruction cache 514 may also be loaded with instructions from cache memory system 450 and/or main memory 460, as needed, via load control unit 520.

ALU 516 performs arithmetic operations such as addition, subtraction, multiplication, multiply and accumulate, absolute, negation, comparison, saturation, etc. ALU 516 may also perform logical operations such as AND, OR, XOR, etc. ALU 516 may also perform format conversion, e.g., from integers to floating point numbers, and vice versa. ALU 516 may be a quad ALU or one or more scalar ALUs. Constant buffer 518 stores constant values used by ALU 516. Constant buffer 518 may also store pixel offsets and kernel coefficients for convolution filtering.

Load control unit 520 controls the flow of data and instructions for various units within shader core 430. Load control unit 520 interfaces with cache memory system 450 and loads instruction cache 514, constant buffer 518, and a register file banks/output buffer 522 with data and instructions from cache memory system 450. Load control unit 520 also saves the data in output buffer 522 to cache memory system 450. Load control unit 520 also provides instructions to texture engine 440 and receives intermediate results from the texture engine.

Output buffer 522 stores intermediate results as well as final results from ALUs 516 and 544. A demultiplexer (Demux) 524 receives the final results for the executed threads from output buffer 522 and provides these results to the graphics applications.

Within texture engine 440, a texture address generator 540 computes the position of each pixel based on the reference position and the x and y offsets for that pixel, e.g., as shown in equations (10) through (13). Address generator 540 also performs rounding of the pixel positions for mode 0 instructions. Address generator 540 provides the pixel positions to a texture cache 542.

Texture cache 542 stores pixels for texture engine 440. Texture cache 542 receives the pixel positions from address generator 540 and determines whether the pixels are stored in the cache. Texture cache 542 provides the pixels to ALU 544 if these pixels are currently available in the cache and performs a cache fill from cache memory system 450 if the pixels are not available. After the cache fill, texture cache 542 provides the pixels to ALU 544.

ALU 544 performs computation for mode 0 and mode 1 instructions. For a mode 0 instruction, ALU 544 multiplies up to four pixels received from texture cache 542 with up to four kernel coefficients received in the mode 0 instruction, accumulates the product(s), and provides an intermediate result for the instruction. For a mode 1 instruction, ALU 544 computes an interpolated coefficient at the pixel position with the four kernel coefficients received in the mode 1 instruction, multiplies the pixel with the interpolated coefficient, and provides an intermediate result for the instruction.

In an embodiment, convolution filtering of an H×W grid may be performed by graphics system 400 as follows. A compiler (e.g., one of compilers 412 in FIG. 4) receives a convolution command/instruction that may include the kernel, the H and W dimensions, the shiftX and shiftY values, and the mode to use for convolution filtering. In an embodiment, the compiler performs the following processing for convolution filtering of the H×W grid:

Compute kernel coefficients for separable convolution filtering as $k_{i,j}=k_i \cdot k_j$,
Compute the x and y offsets for all pixels in the H×W grid,
Partition the H×W grid into 2×2 or smaller sections, and
Generate mode 0 or mode 1 instructions for the sections.

If mode 0 is selected, then the compiler may generate a mode 0 instruction for each section of the H×W grid. If mode 1 is selected, then the compiler may generate a mode 1 instruction for each pixel in the H×W grid. Each mode 0 or mode 1 instruction may include the parameters given above. The compiler may determine which kernel coefficients to include in each instruction and which x and y offsets apply to the pixel(s) in the instruction. The compiler may store the kernel coefficients as well as the x and y offsets in constant buffer 518.

In an embodiment, shader core 430 performs the following processing for convolution filtering of the H×W grid:

Dispatch mode 0 or mode 1 instructions to texture engine 440,
Receive an intermediate result from texture engine 440 for each dispatched instruction, and Accumulate the intermediate results for all dispatched instructions to generate a final result for the H×W grid.

Texture engine 440 processes the mode 0 and mode 1 instructions received from shader core 430. In an embodiment, texture engine 440 performs the following processing for a mode 0 instruction:

Compute the positions of up to four pixels in a section based on the reference position and the x and y offsets, e.g., as shown in equations (10) through (13), Round the pixel positions, Retrieve up to four pixels at the rounded pixel positions from texture cache 542, Assign up to four coefficients in the instruction to up to four pixels based on the 4-bit pixel mask, and Multiply the pixels with the coefficients and accumulate to generate an intermediate result for the instruction.

In an embodiment, texture engine 440 performs the following processing for a mode 1 instruction:

Compute the position of one pixel based on the reference position and the x and y offsets, e.g., as shown in equation (10), Compute an interpolated coefficient at the pixel position based on four coefficients in the instruction, e.g., using bilinear interpolation, Retrieve the pixel at the computed position from texture cache 542, and Multiply the pixel with the interpolated coefficient to generate an intermediate result for the instruction.

Convolution filtering of the H×W grid may also be performed in other manners. In another embodiment, shader core 430 computes the x and y offsets for the pixels and determines the kernel coefficients to include in each mode 0 or mode 1 instruction. In yet another embodiment, shader core 430 computes and provides the pixel positions to texture engine 440. In yet another embodiment, a mode 0 or mode 1 instruction includes the current accumulated result for all prior instructions, and texture engine 440 combines this accumulated result with the intermediate result and provides an updated accumulated result. In yet another embodiment, shader core 430 computes and provides the pixel positions to texture engine 440 and further performs weighting and accumulation of the intermediate results from texture engine 440. In still yet another embodiment, shader core 430 includes a start flag indicating the start of convolution filtering in an instruction for the first section. Texture engine 440 accumulates the intermediate result(s) for each section. Shader core 430 includes an end flag indicating the end of convolution filtering in an instruction for the last section. Texture engine 440 receives the end flag, accumulates the last intermediate result, and sends the final result to shader core 430. This embodiment may reduce traffic between texture engine 440 and shader core 430.

Each pixel may have various attributes such as space coordinates, color values, texture coordinates, etc. Each attribute may have up to four components. For example, space coordinates may be given by either three components x, y and z or four components x, y, z and w, where x and y are horizontal and vertical coordinates, z is depth, and w is a homogeneous coordinate. Color values may be given by three components r, g and b or four components r, g, b and a, where r is red, g is green, b is blue, and a is a transparency factor that determines the transparency of a pixel. Texture coordinates are typically given by horizontal and vertical coordinates, u and v. A pixel may also be associated with other attributes. Convolution filtering may be selectively performed or omitted for each component of each attribute. A channel mask may be used to determine which components of which attribute to perform convolution filtering.

The techniques described herein can perform convolution filtering on grids of virtually any dimension using hardware commonly available in a graphics processor. The techniques reuse the available hardware to perform convolution filtering and further divide the processing and storage between the shader core and texture engine. In some embodiments described above, within texture engine 440, ALU 544 performs convolution computation or derives the interpolated coefficient, and texture cache 542 stores the pixels. Within shader core 430, ALU 516 performs final accumulation, and constant buffer 518 stores the pixel offsets and kernel coefficients. The storage and computation may also be divided between shader core 430 and texture engine 440 in other manners.

The techniques described herein provide a flexible, programmable, and powerful convolution filtering tool with little additional hardware cost. The techniques support virtually any kernel size and any convolutions. The two modes 0 and 1 described herein allow applications and drivers to flexibly trade off between performance and quality based on the desired image results.

Figure 6:
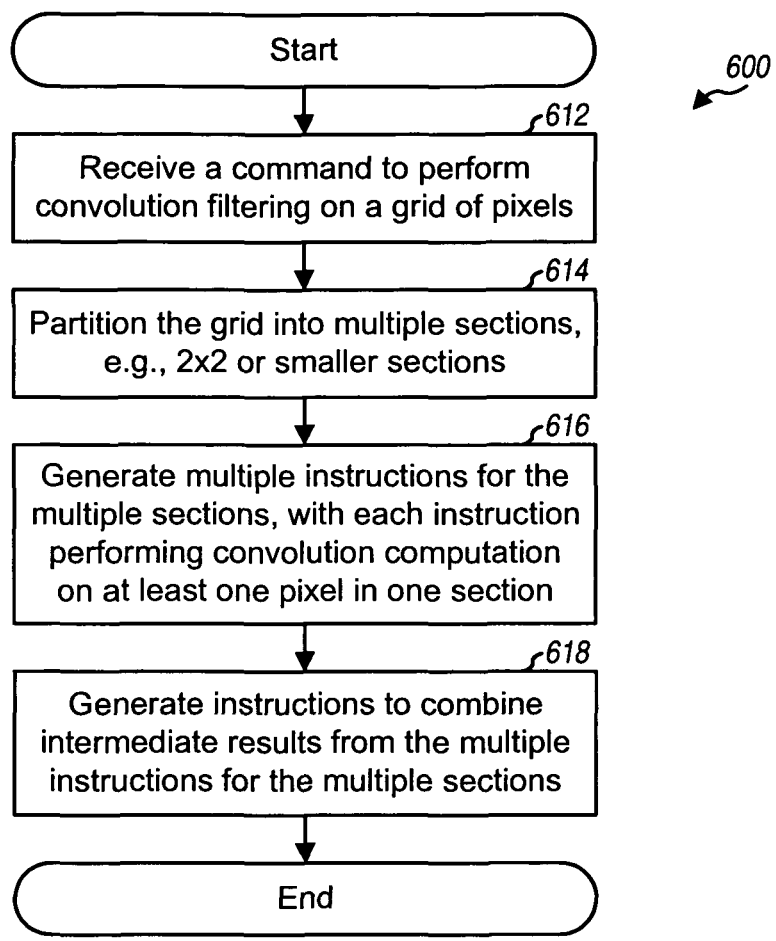
FIG. 6 shows a process for convolution filtering with partitioning.

FIG. 6 shows an embodiment of a process 600 for convolution filtering with partitioning. Process 600 may be performed by a compiler or some other entity. A command/instruction to perform convolution filtering on a grid of pixels is received (block 612). The grid is partitioned into multiple sections, where each section may be 2×2 or smaller (block 614). Multiple instructions are generated for the multiple sections, with each instruction performing convolution computation, e.g., as shown in equation (9), on at least one pixel in one section (block 616). Each instruction may include pixel position information for the pixel(s) covered by that instruction and at least one coefficient from a kernel. The pixel position information may comprise a reference position, at least one horizontal offset, and at least one vertical offset or some other information. Instructions to combine intermediate results from the multiple instructions for the multiple sections may also be generated (block 618).

Figure 7:
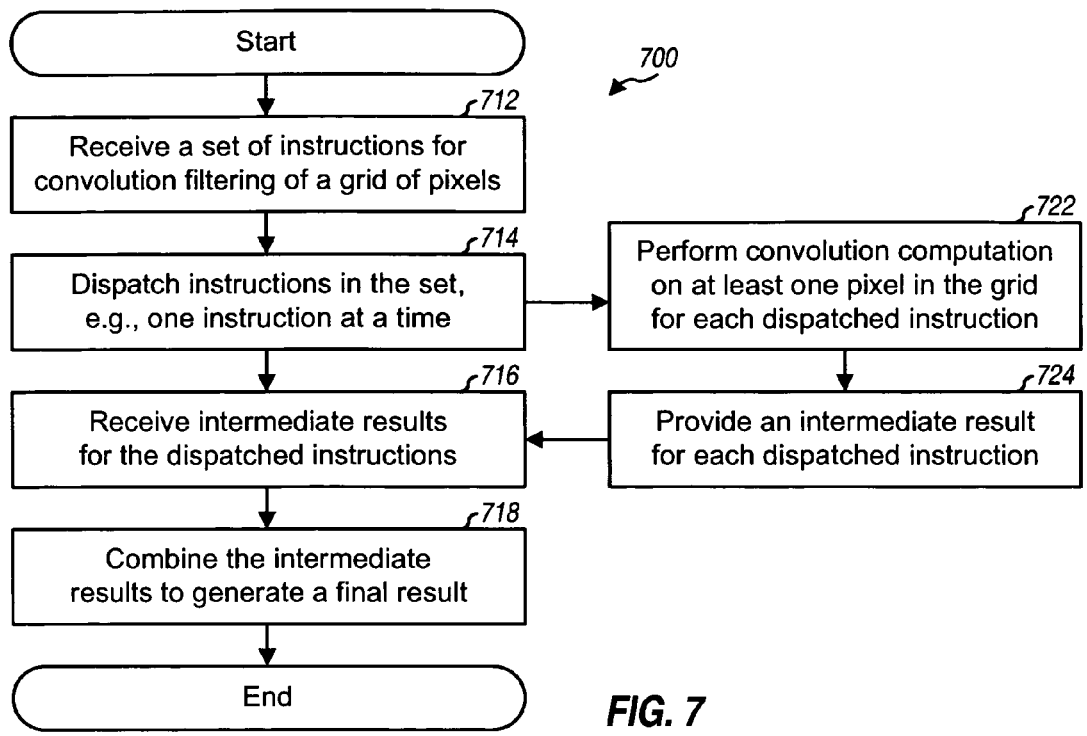
FIG. 7 shows a process for convolution filtering by a graphics processor.

FIG. 7 shows an embodiment of a process 700 for convolution filtering with distributing processing. Process 700 may be performed by a graphics processor or some other entity. A set of instructions for convolution filtering of a grid of pixels is received (block 712). Instructions in the set are dispatched, e.g., one instruction at a time (block 714). Convolution computation is performed on at least one pixel in the grid for each dispatched instruction (block 722). An intermediate result is provided for each dispatched instruction (block 724). Intermediate results for the dispatched instructions are received (block 716) and combined to generate a final result for the convolution filtering (block 718). In an embodiment, blocks 712 through 718 are performed by a first processing unit (e.g., a shader core), and blocks 722 and 724 are performed by a second processing unit (e.g., a texture engine).

For each dispatched instruction, the second processing unit may compute at least one pixel position based on a reference position and horizontal and vertical offsets received in the instruction, retrieve at least one pixel from memory for the computed pixel position(s), multiply the retrieved pixel(s) with at least one coefficient received in the instruction, and accumulate at least one result of the multiply to generate the intermediate result for the instruction. Alternatively, for each dispatched instruction, the second processing unit may compute a pixel position based on a reference position and horizontal and vertical offsets received in the instruction, retrieve a pixel from memory for the computed pixel position, derive an interpolated coefficient based on coefficients received in the instruction, and multiply the retrieved pixel with the interpolated coefficient to generate the intermediate result for the instruction. The second processing unit may also perform processing in other manners.

Figure 8:
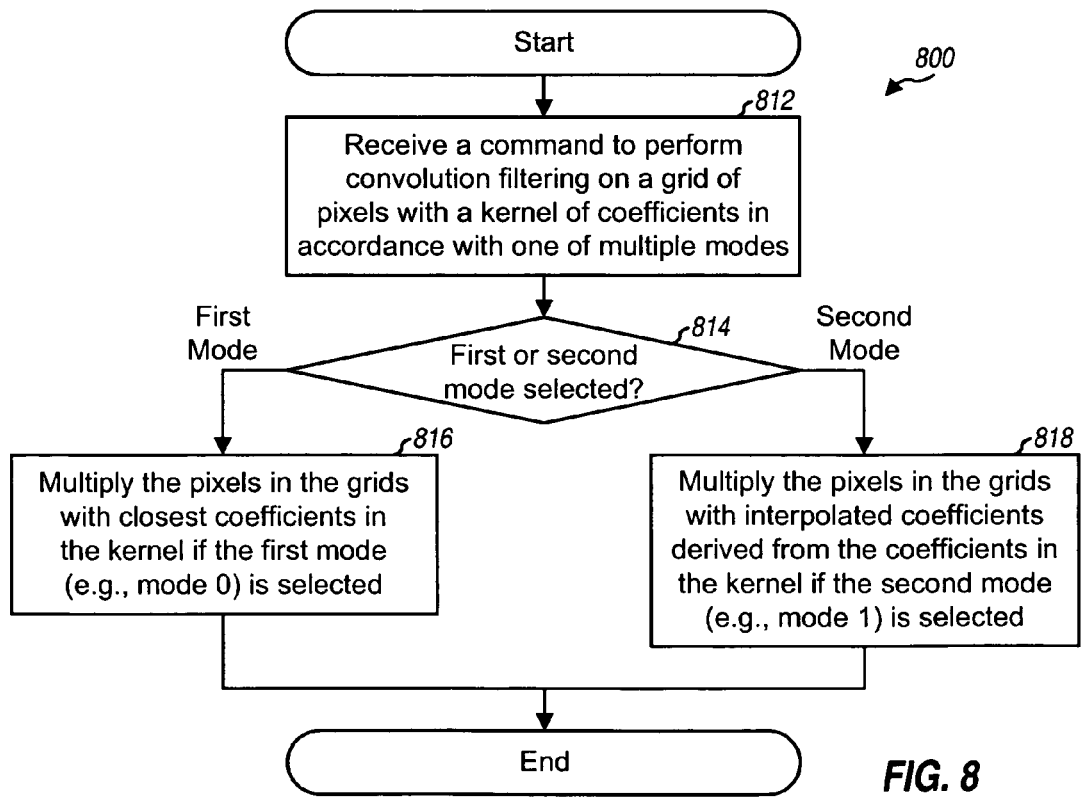
FIG. 8 shows a process for convolution filtering with multiple modes.

FIG. 8 shows an embodiment of a process 800 for convolution filtering with multiple modes. Process 800 may be performed by a graphics system or some other entity. A command or instruction is received to perform convolution filtering on a grid of pixels with a kernel of coefficients in accordance with one of multiple modes comprising a first mode and a second mode (block 812). If the first mode (e.g., mode 0) is selected, as determined in block 814, then the pixels in the grids are multiplied with the closest coefficients in the kernel (block 816). If the second mode (e.g., mode 1) is selected, as determined in block 814, then the pixels in the grids are multiplied with interpolated coefficients derived from the coefficients in the kernel (block 818). For the first mode, the pixels in the grid may be multiplied in accordance with a set of instructions, with each instruction covering up to four pixels. For the second mode, the pixels in the grid may be multiplied in accordance with a set of instructions, with each instruction covering a single pixel. Each instruction may also cover some other number of pixels for the first and second modes, depending on hardware capability.

The convolution filtering techniques and graphics processor described herein may be used for wireless communication, computing, networking, personal electronics, etc. An exemplary use for wireless communication is described below.

Figure 9:
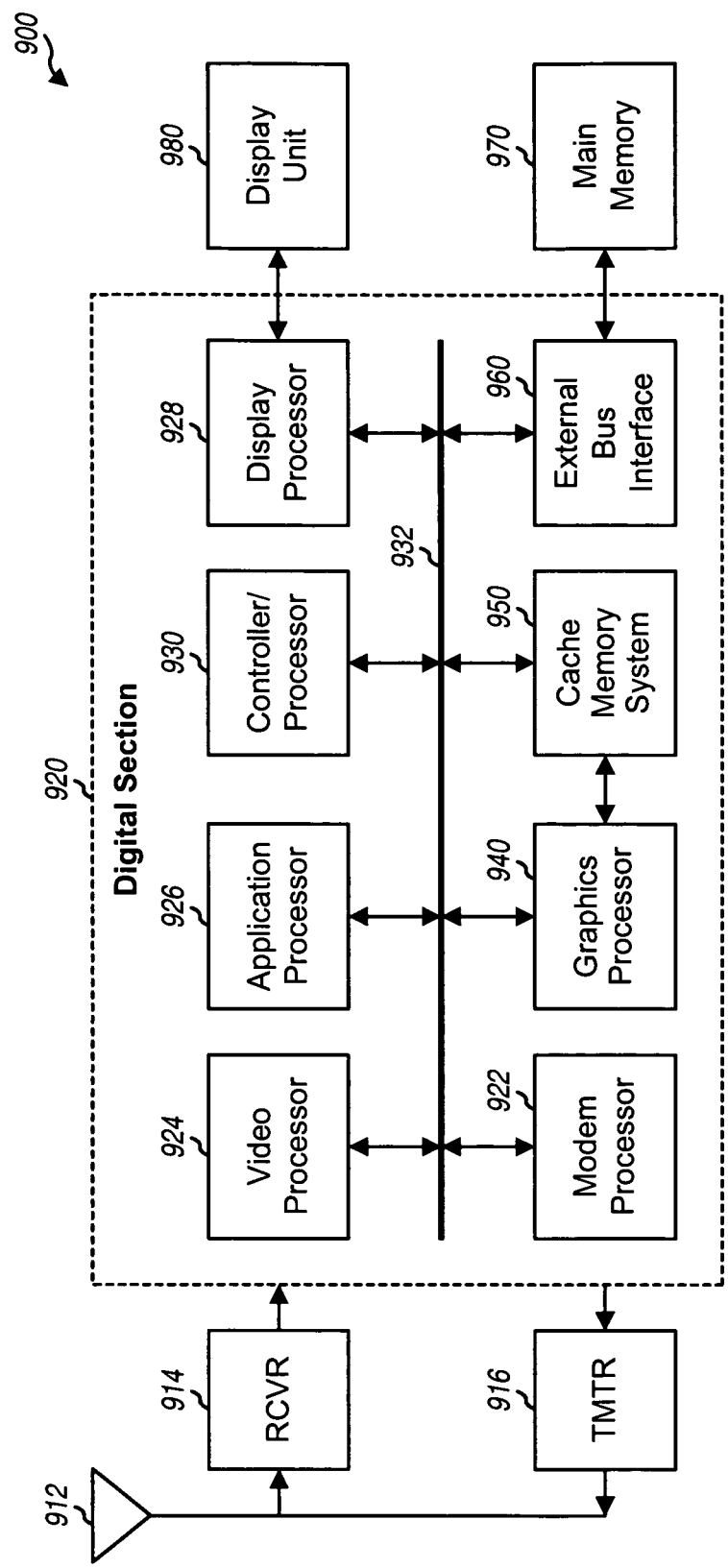
FIG. 9 shows a block diagram of a wireless device.

FIG. 9 shows a block diagram of an embodiment of a wireless device 900 in a wireless communication system. Wireless device 900 may be a cellular phone, a terminal, a handset, a personal digital assistant (PDA), or some other device. The wireless communication system may be a Code Division Multiple Access (CDMA) system, a Global System for Mobile Communications (GSM) system, or some other system.

Wireless device 900 is capable of providing bi-directional communication via a receive path and a transmit path. On the receive path, signals transmitted by base stations are received by an antenna 912 and provided to a receiver (RCVR) 914. Receiver 914 conditions and digitizes the received signal and provides samples to a digital section 920 for further processing. On the transmit path, a transmitter (TMTR) 916 receives data to be transmitted from digital section 920, processes and conditions the data, and generates a modulated signal, which is transmitted via antenna 912 to the base stations.

Digital section 920 includes various processing and interface units such as, for example, a modem processor 922, a video processor 924, an application processor 926, a display processor 928, a controller/processor 930, a graphics processor 940, and an external bus interface (EBI) 960. Modem processor 922 performs processing for data transmission and reception (e.g., encoding, modulation, demodulation, and decoding). Video processor 924 performs processing on video content (e.g., still images, moving videos, and moving texts) for video applications such as camcorder, video playback, and video conferencing. Application processor 926 performs processing for various applications such as multi-way calls, web browsing, media player, and user interface. Display processor 928 performs processing to facilitate the display of videos, graphics, and texts on a display unit 980. Controller/processor 930 may direct the operation of various processing and interface units within digital section 920.

Graphics processor 940 performs processing for graphics applications and may be implemented as described above. For example, graphics processor 940 may include shader core 430 and texture engine 440 in FIGS. 4 and 5. Graphics processor 940 may also perform process 600 in FIG. 6, process 700 in FIG. 7, process 800 in FIG. 8, and/or other processes. Application processor 926 may execute one or more compilers that may perform process 600 in FIG. 6 and/or other processes. A cache memory system 950 stores data and/or instructions for graphics processor 940. Cache memory system 950 may be implemented with configurable caches that may be assigned to different engines within graphics processor 940 and/or dedicated caches that are assigned to specific engines. EBI 960 facilitates transfer of data between digital section 920 (e.g., the caches) and main memory 970.

Digital section 920 may be implemented with one or more digital signal processors (DSPs), micro-processors, reduced instruction set computers (RISCs), etc. Digital section 920 may also be fabricated on one or more application specific integrated circuits (ASICs) or some other type of integrated circuits (ICs).

The techniques described herein may be implemented by various means. For example, the techniques may be implemented in hardware, firmware, software, or a combination thereof. For a hardware implementation, the processing units used to perform convolution filtering may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units.

For a firmware and/or software implementation, the techniques may be implemented with modules (e.g., procedures, functions, and so on) that perform the functions described herein. The firmware and/or software codes may be stored in a memory (e.g., memory 950 or 970 in FIG. 9) and executed by a processor (e.g., processor 930). The memory may be implemented within the processor or external to the processor.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method comprising:
   receiving, at a first processor, a command to perform convolution filtering on a grid of pixels;
   partitioning the grid into multiple sections;
   generating multiple instructions for the multiple sections, each instruction for performing a convolution computation on at least one pixel in one section;
   dispatching at least one of the multiple instructions to a second processor, the second processor multiplying the at least one pixel with at least one coefficient received in the at least one instruction, and accumulating at least one result of the multiply to generate an intermediate result; and
   generating instructions to combine intermediate results from the multiple instructions for the multiple sections.

2. The method of claim 1, further comprising:
determining position of each pixel in the grid; and
including pixel position information for the at least one pixel in each instruction.

3. The method of claim 1, further comprising:
receiving a kernel of coefficients for the grid of pixels; and
including at least one coefficient from the kernel in each instruction.

4. The non-transitory computer-readable media of claim 1, and further for storing instructions operable to:
receive a kernel of coefficients for the grid of pixels; and
include at least one coefficient from the kernel in each instruction.

5. An apparatus comprising:
first processing means for receiving an instruction, multiplying a pixel by a coefficient in the instruction and accumulating a result of the multiplication to generate an intermediate result for the received instruction; and
second processing means for receiving a command to perform convolution filtering on a grid of pixels; for partitioning the grid into multiple sections; for generating multiple instructions for the multiple sections, each instruction performing convolution computation on at least one pixel in one section; for dispatching each instruction to the first processing means; and for generating instructions to combine intermediate results from the multiple instructions for the multiple sections.

6. The apparatus of claim 5, further comprising:
means for determining position of each pixel in the grid; and
means for including pixel position information for the at least one pixel in each instruction.

7. The apparatus of claim 5, further comprising:
means for receiving a kernel of coefficients for the grid of pixels; and
means for including at least one coefficient from the kernel in each instruction.

8. The graphics processor of claim 5, wherein for each dispatched instruction the second processing unit is configured to retrieve a pixel from memory, to derive an interpolated coefficient for the pixel based on coefficients received in the instruction, and to multiply the pixel with the interpolated coefficient to generate the intermediate result for the instruction.

9. A non-transitory computer-readable media storing instructions that configure circuitry to:
receive, at a first processor, a command to perform convolution filtering on a grid of pixels;
partition the grid into multiple sections;
generate multiple instructions for the multiple sections, each instruction performing convolution computation on at least one pixel in one section;
dispatch the multiple instructions to a second processor, which is configured to multiply a pixel in a section with a coefficient in one of the multiple instructions, and accumulated a result of the multiplication as an intermediate result; and
generate instructions to combine intermediate results from the multiple instructions for the multiple sections.

10. The non-transitory computer-readable media of claim 2, and further for storing instructions operable to:
determine position of each pixel in the grid; and
include pixel position information for the at least one pixel in each instruction.

11. An graphics processor comprising:
a first processing unit configured to receive a set of instructions for convolution filtering of a grid of pixels, to dispatch a plurality of instructions in the set, to receive intermediate results for the dispatched instructions, and to combine the intermediate results to generate a final result for the convolution filtering of the grid of pixels; and
a second processing unit configured to receive the instructions dispatched by the shader core, to perform computation on at least one pixel in the grid for each instruction, and to provide an intermediate result for each instruction, wherein the second processing unit is configured to retrieve the at least one pixel from memory, to multiply the at least one pixel with at least one coefficient received in the instruction, and to accumulate at least one result of the multiply to generate the intermediate result for the instruction.

12. The graphics processor of claim 11, wherein the first processing unit is a shader core and the second processing unit is a texture engine.

13. The graphics processor of claim 11, wherein each dispatched instruction covers a 2×2 or smaller section of the grid.

14. The graphics processor of claim 11, wherein for each dispatched instruction the second processing unit is further configured to compute at least one position of the at least one pixel based on a reference position and horizontal and vertical offsets received in the instruction, and to retrieve the at least one pixel from the memory at the at least one position.

15. The graphics processor of claim 11, wherein the convolution filtering is performed with a kernel of coefficients, and wherein the at least one coefficient received in each instruction is closest to the at least one pixel among the coefficients in the kernel.

16. The graphics processor of claim 11, wherein the convolution filtering is performed with a kernel of coefficients, and wherein the coefficients received in each instruction are closest to the pixel among the coefficients in the kernel.

17. The graphics processor of claim 11, wherein for each dispatched instruction the second processing unit is further configured
to derive the interpolated coefficient based on four coefficients using bilinear interpolation.

18. The graphics processor of claim 11, wherein for each dispatched instruction the second processing unit is further configured to compute position of the pixel based on a reference position and horizontal and vertical offsets received in the instruction, and to retrieve the pixel from the memory at the computed position.

19. The graphics processor of claim 11, wherein the second processing unit comprises a cache operative to store pixels, and wherein for each dispatched instruction the second processing unit is configured to retrieve the at least one pixel from the cache and to perform a cache fill if the at least one pixel is not located in the cache.

20. The graphics processor of claim 11, wherein the first processing unit comprises a buffer operative to store a kernel of coefficients used for convolution filtering.

21. The graphics processor of claim 20, wherein the buffer is further operative to store horizontal and vertical offsets for each of the pixels in the grid.

22. The graphics processor of claim 11, wherein each dispatched instruction comprises a reference position, up to two horizontal offsets and up to two vertical offsets for up to four pixels, up to four coefficients, and a mask identifying the up to four pixels in the instruction.

23. The graphics processor of claim 11, wherein each dispatched instruction comprises a reference position, a horizontal offset and a vertical offset for a pixel, and four coefficients for the pixel.

24. A method comprising:
receiving a set of instructions for convolution filtering of a grid of pixels;
dispatching a plurality of instructions in the set;
performing computation on at least one pixel in the grid for each dispatched instruction to obtain an intermediate result for the dispatched instruction; and
combining intermediate results for the plurality of dispatched instructions to generate a final result,
wherein performing computation on the at least one pixel in the grid for each dispatched instruction comprises:
retrieving the at least one pixel from memory,
multiplying the at least one pixel with at least one coefficient received in the instruction, and
accumulating at least one result of the multiply to generate the intermediate result for the instruction.

25. The method of claim 24, wherein the multiplying comprises:
deriving an interpolated coefficient for the pixel based on coefficients received in the instruction, and
multiplying the pixel with the interpolated coefficient to generate the intermediate result for the instruction.

* * * * *